Sept. 13, 1960 V. P. GUINN 2,952,775
METHOD AND APPARATUS FOR THE ANALYTICAL
DETERMINATION OF DEUTERIUM
Filed Feb. 17, 1959
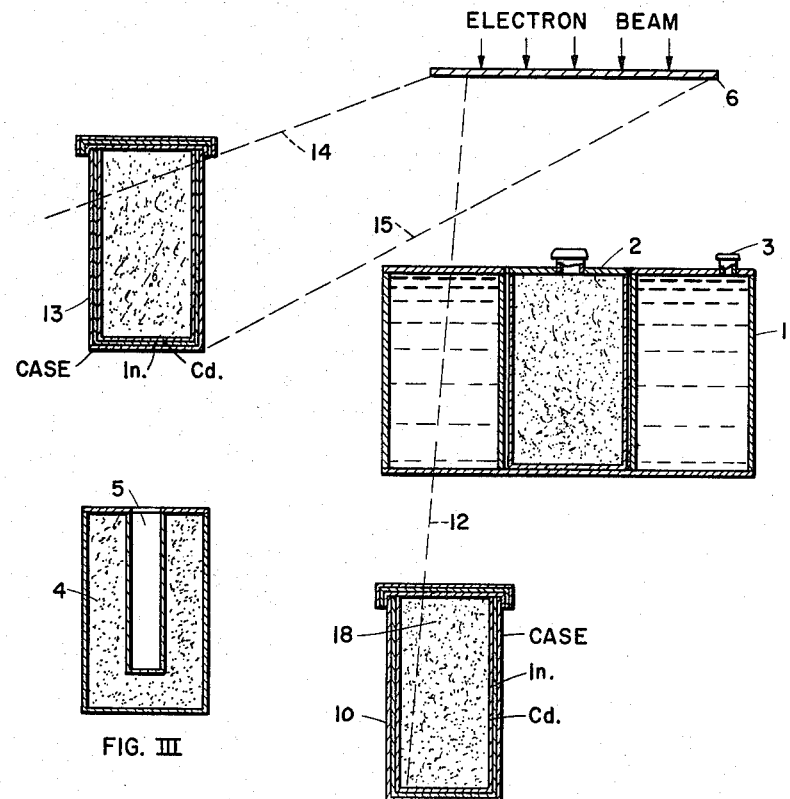
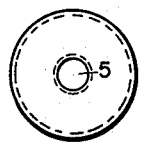
FIG. IV
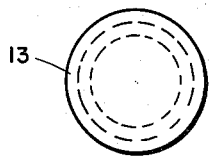
FIG. V
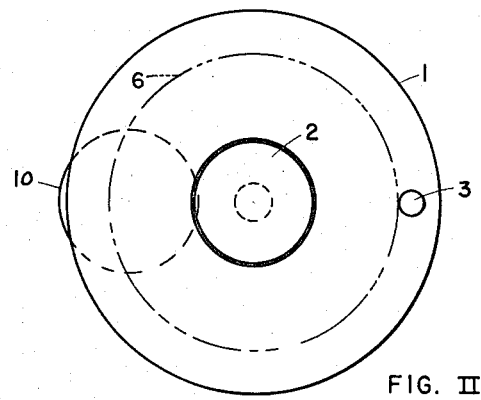
FIG. II
INVENTOR
VINCENT P. GUINN
BY: *John H. Colvin*
HIS ATTORNEY United States Patent Office 2,952,775
Patented Sept. 13, 1960

2,952,775

METHOD AND APPARATUS FOR THE ANALYTICAL DETERMINATION OF DEUTERIUM

Vincent P. Guinn, Walnut Creek, Calif., assignor to Shell Oil Company, New York, N.Y., a corporation of Delaware Filed Feb. 17, 1959, Ser. No. 793,715

2 Claims. (Cl. 250—43.5)

This invention relates to a new method for analyzing various hydrogen-containing materials to determine the relative or absolute content or concentration of deuterium therein and to apparatus therefor.

Deuterium (heavy hydrogen), when present in fairly high concentrations, has been hitherto determined by converting the hydrogen in the sample to water and measuring the density of the latter. It has also been determined by converting the hydrogen in the sample to water or hydrogen gas and analyzing the water or gas by mass spectrometric methods. When the sample is initially, or can be converted to, a quite pure compound, e.g. an alcohol, the deuterium may sometimes also be determined through infrared spectroscopy. Except a very particular and elaborate application of the mass spectrometric method, none of these methods are capable of analyzing for deuterium when its concentration is at or near the level of its natural abundance which is about one atom in 6700 atoms of hydrogen. Regarding this last method and the problems involved, reference may be had to "Instrumental Problems Encountered in Mass Spectrometric Isotope Analysis of Water Samples" by H. W. Washburn, C. E. Berry and L. G. Hall, Nat. Bur. Stds. Circular No. 522, pages 141–149 (1953). Also, in most cases, in making the analysis by the hitherto used methods the sample is destroyed and the preliminary chemical treatments required to bring the deuterium into an analyzable form are involved, time-consuming and costly.

An object of the invention is to provide an analytical method and apparatus for the determination of deuterium in samples containing the same which method and apparatus have one or more of the following advantages.

(1) Capable of accurate determination of deuterium when present in concentrations well below that of the natural abundance of deuterium and below those determinable by most previously known methods.

(2) Allowing analysis for deuterium in organic materials with little or no destruction or alteration of the sample.

(3) Capable of a complete analysis in a short time of from a few minutes to a few hours with very little manipulation.

The method and apparatus of the invention are also useful for certain other analyses mentioned below, the achievement of which may also be considered objects of the invention.

The method of the invention is based in part on the fact that when any material containing deuterium is subjected to X-rays having an energy above 2.23 mev., neutrons are split off by the $H^2(x,n)H^1$ reaction. The neutrons so split from the deuterium nucleus are capable of reacting with the nuclei of certain elements to produce radioactive isotopes and the radioactivity so produced may be accurately measured, either in the form of total activity or in the form of activity at the specific energy level characteristic of the particular isotope. It is found that the activity so produced is an accurate measure of the content of deuterium and may be used to determine the concentration of deuterium even when present much below the level of its natural abundance.

The method of the invention in outline consists in placing the sample to be analyzed in close proximity to a quantity of a substantially non-radioactive material containing an element activatable by neutron bombardment to a radioactive isotope having a convenient half life, subjecting the sample in proximity of said material to X-ray radiation containing a sizable flux of photons with energies above 2.23 mev., then measuring the radioactivity level of said material and correlating the measured activity level with that of a standard containing a known original or additional amount of deuterium treated under substantially the same experimental conditions.

The method is particularly applicable and useful in the determination of deuterium in various liquid materials. Solid and gaseous materials may also be analyzed by the method although the sensitivity may be somewhat less and some modifications of the manipulative technique and the sample cell may be necessary to calibrate the method with an internal standard as will be later described. When analyzing for deuterium the sample should contain no beryllium and preferably no appreciable amount of boron.

With the apparatus which I have used in the development of the method the sample should be of a size to contain at least about one microgram of deuterium when the deuterium concentration is relatively high as frequently encountered in tracer work. When the concentration of deuterium is near or below that of its natural abundance the sample for this same apparatus should be of such size as to contain at least about five micrograms of deuterium. Thus, the sample for this apparatus may range from a fraction of a gram to several hundred grams, e.g. 500 grams. With further refinement of the apparatus and the technique samples containing even lower amounts of deuterium may be accurately analyzed.

While the weight and/or volume of the sample will ordinarily be known and this knowledge is desirable it is not essential for, as will be explained later, the result of the analysis may be reported as merely a factor or multiple of the natural abundance of deuterium in water or of the concentration in any other chemically similar sample of known deuterium content. If the results are to be reported in terms of micrograms of deuterium per cubic centimeter of sample, or gram of sample, it is essential to determine either directly or indirectly the volume or weight of the sample. While knowledge of the weight and volume of the sample are not essential, they are useful in most cases and practically essential in others. Since there is little excuse for not determining the weight and volume of the sample it is, therefore, assumed hereinafter that at least one of these quantities is known.

It is essential that the volume or weight of the sample be reproducible within the limits of accuracy sought as between at least the sample and the sample to which an internal standard has been added. For the analysis of a number of samples based on a single standardization it is essential that the volume of the sample be reproducible from one determination to the next. This may be conveniently ensured by repeated use of the same sample cell filled to a constant volume.

The method and apparatus of the invention will be further described with the help of the accompanying drawing wherein Figures I and II are elevation and plan cross-sections, respectively, of one assembly involving a ring type sample cell along with two additional monitor cells. These cells are shown in one suitable geometrically spaced relationship. Figures III and IV are elevation and plan cross-sections of a second type of cell which can be substituted for the sample cell illustrated in Figures I and II. Fig. V is a plan view of the cell 13.

The sample cell or container may be constructed of any unreactive and suitably stable material pervious to the X-rays and having at least one face or wall pervious to the emitted neutrons. Thus quartz, glass (other than those containing boron), graphite, ceramics and most metals may be used and in many cases even organic materials such as plastics may be used. A very suitable material for most general applications is aluminum. The aluminum should be free of beryllium. It will be understood that when the sample to be analyzed contains very small concentrations of deuterium below that of its natural abundance a container substantially devoid of hydrogen is to be preferred since otherwise the naturally occurring deuterium in the container would reduce the sensitivity of the method. On the other hand, in the case of samples containing high concentrations of deuterium as, for example, in tracer work the small amount of deuterium naturally occurring in most organic plastic containers is without any material effect.

As indicated in the above outline the sample to be analyzed is placed in close proximity to a substantially non-radioactive material containing an element capable of being activated by neutron capture. For simplicity in discussing the physical relationship this material will, for the time being, be referred to as the neutron acceptor material. By close proximity is meant in the absence of special shielding and in sufficient physical proximity to allow neutrons generated from the deuterium in the sample to penetrate said neutron acceptor material at energies affording a reasonable chance of neutron capture.

While other suitable physical arrangements will be apparent to those skilled in the art the two main and most satisfactory relationships are (1) those in which the sample surrounds the neutron acceptor material and (2) those in which the neutron acceptor material surrounds the sample. "Surround" in this case does not necessarily imply surrounding in all three dimensions since surrounding in two dimensions normal to the main X-ray beam is ample and even in this case a complete surrounding in two dimensions, although desirable, is not essential. Complete surrounding in at least two dimensions normal to the X-ray beam is preferred as it affords better sensitivity but even side by side placing of the sample cell and the neutron acceptor material is theoretically possible and actually practical when the concentration of deuterium is fairly high as is often the case in tracer work. The term "close proximity" is intended to cover situations as just described while the term "surrounding" may be defined as covering over 50% of the perimeter in a plane normal to the main X-ray beam. The term "main X-ray beam" is used since in general, the X-rays produced travel in the same direction as the electrons striking the target metal but sizable amounts are emitted from the target in all directions.

For analyzing large samples having a very low concentration of deuterium one suitable arrangement is that illustrated in Figures I and II of the accompanying drawing. Referring to Figures I and II the cell 1, constructed for example of aluminum, is in the form of a covered dish having a well in the center of a size to accommodate a cylindrical cell 2. The cell 1 is completely closed except for a closable opening 3 for the insertion and withdrawing of the sample. In practice the cell 1 is completely or substantially completely filled with the sample to be analyzed and the cell 2 containing the neutron acceptor material is surrounded by the sample. For the analysis of smaller but still relatively large samples a similar device may be used in which the sample is placed in the central cylindrical cell 2 and the neutron acceptor material is placed in the surrounding cell 1. For small samples of a fraction of a gram up to several grams a cell of the form shown in Figures III and IV is most suited. The cell 4 contains the neutron acceptor material and the sample in a small container, e.g. of glass or plastic, is inserted in the central well 5.

When the cell containing the neutron acceptor material is in the form of a cylindrical cell such as 2 or 4 (which may conveniently be of the same size) the cell, in order to measure its activity, may be placed in a sodium iodide scintillation counter crystal having a well to fit the cell. When, on the other hand, the neutron acceptor material is in the larger ring shaped cell as in Figure I a cylindrical sodium iodide scintillation counter is inserted in the central well after removing the cell containing the sample. While a sodium iodide scintillation counter is the preferred instrument for measuring (counting) the radioactivity, other devices serving the same purpose may also be used.

In principle any material containing an element which is capable of capturing neutrons and being thereby converted into a radioactive isotope may be used as the neutron acceptor material. There are, however, certain practical considerations which make certain operative elements preferable to others. While an element convertible to an isotope having a half life of less than a minute can be used it will be evident that with such an element only a short counting time is possible and that, therefore, the accuracy and sensitivity of the method is far from optimum. For this reason it is preferred to use as the neutron acceptor material an element that forms an isotope having a half life of at least one and preferably several minutes. On the other hand, if an element is chosen for the neutron acceptor material which forms an isotope having a very long half life it will be apparent that an exceedingly long irradiation is necessary to achieve maximum sensitivity and that an excessive period of time must elapse before the decay has taken place to the extent that the cell has a reasonably low background activity and may be reused. For this reason an element forming an isotope having a half life of less than a day is preferred. Preferred elements and radioactive isotopes and the half lives of the isotopes are shown in the following table.

| | | |
|---|---|---|
| Iodine, $I^{128}$ | minutes | 25 |
| Manganese, $Mn^{56}$ | hours | 2.6 |
| Vanadium, $V^{52}$ | minutes | 3.8 |
| Rhenium, $Re^{188}$ | do | 20 |

It will be understood that the form in which the neutron acceptor element is present in the neutron acceptor cell is relatively immaterial. The element, therefore, may be used in the form of the free element or almost any chemical compound containing the element. Exceptions are compounds containing boron or beryllium. Merely by way of example, very suitable neutron acceptor materials are, for instance, iodine, ammonium iodide, manganese, and manganese dioxide. It is also possible to use a mixture of two more such materials as for instance a mixture of vanadium pentoxide and rhenium sulfide. The use of mixtures can increase the accuracy in certain cases but it introduces added complications and is not to be generally recommended.

The same cell containing the neutron acceptor material is used for standardization or calibration of the method and for carrying out the analysis and it is always positioned in the same spacial relationship to the sample cell. This assembly of the sample cell and the neutron acceptor cell is always placed in substantially the same spacial relationship with respect to the X-ray source. Before beginning any analysis it is desirable that the background activity of the neutron acceptor cell be measured and this is particularly important when the analysis follows shortly after a previous analysis or when the neutron acceptor material forms an isotope having a relatively long half life.

Referring to Figure I the reference number 6 indicates the target metal, as for example a sheet of gold, which produces the X-rays and may be considered the X-ray source. Thus, a beam of electrons of suitable energy scan the target 6 and the resulting X-rays which issue in all directions but are mainly concentrated normal to the plate penetrate the sample cell and the neutron acceptor cell. The X-rays produced have a continuous energy spectrum ranging from zero up to the energy of the bombarding electrons. However, it is only the photons having an energy above 2.23 mev. that are useful. Consequently it is necessary to irradiate the plate 6 with electrons of sufficient energy to produce a sizable flux of photons with energies about this level. This flux should be at least about $10^{10}$ photons per second and preferably $10^{12}$ photons per second. Such a source of electrons is best produced with a Van de Graaff generator or a linear accelerator.

The length of time that the sample is irradiated may vary considerably but should be reproducible to the limits of precision sought. The minimum time will depend upon the amount of deuterium in the sample, the closeness of its proximity to the neutron acceptor material and to the photon flux applied and may be only a few minutes. The maximum sensitivity is theoretically obtained when the time of irradiation equals several times the half life of the isotope being produced, and no advantage is to be expected by any much longer irradiation. On the other hand it is also not necessary to continue the irradiation for such time since as will be seen from the example over 8000 counts per minute may be obtained from Mn (half life 2.5 hrs.) after only one hour irradiation even though deuterium was only present in its natural abundance and a decay time of 73 min. elapsed between ending the irradiation and starting the counting.

The carrying out of an analysis will be further illustrated with a specific example. In this example the sample was water containing deuterium in its natural abundance, i.e. 1 deuterium atom per about 6700 hydrogen atoms. The cells used were constructed of aluminum and were of the shape and approximate relative size illustrated in Figures I and II. The cell 1 was filled with the sample (300 cc.) and the cell 2 was packed with about 62.3 grams of $MnO_2$. The cells were assembled as illustrated in a fixed and reproducible spacial relationship to the target plate 6 which was of gold and the assembly was irradiated for one hour with a substatnially constant flux of X-rays, containing a flux of about $10^{12}$ photons per second with energies in the range from about 2.23 mev. to about 3 mev. After a lapse of 73 minutes following the irradiation the cell 2 was placed in a scintillation counter and counted for 18 minutes. About 170,000 counts were recorded. This determination was repeated four times with the following results.

|   | Average counts per minute | Deviation from mean Counts per min. | Percent |
|---|---|---|---|
| 1 | 8620 | −20 | 0.23 |
| 2 | 8590 | −50 | 0.58 |
| 3 | 8650 | +10 | 0.12 |
| 4 | 8690 | +50 | 0.58 |

8640 Mean

Since the sample contained about 5,000 micrograms of deuterium and the counting rate was of the order of 10,000 counts per minute it will be apparent that with an estimated minimum determinable activity of about 10 counts per minute above the background the minimum detectable deuterium would be about 5 micrograms in this case or $1/1000$ of the natural abundance of deuterium. A concentration of only 1% of the natural abundance can be easily and accurately determined. It will be noted also from the above data that the analysis is reproducible to a fraction of a percent of the determined value which in this case was the known natural abundance ratio. By repeating the experiment with any other sample of water to which deuterium has been added or from which a part of the naturally occurring deuterium has been extracted the recorded counts per minute (above the background) of the neutron acceptor material will be a larger or smaller value in proportion to the amount of deuterium present. The addition of a small known amount of deuterium, e.g. in the form of heavy water, and rerunning the analysis of the sample will be hereinafter referred to as a calibration by an internal standard. A repeat determination of an unknown sample with an added known amount of deuterium, i.e. internal calibration, is necessary when an absolute value of the deuterium content is to be determined except where the unknown has the same chemical composition as another sample of known deuterium content in which case a single determination on the unknown sample is sufficient. This lends itself admirably to the determination of a whole series of chemically identical samples e.g. ethyl alcohol, after a single sample of known deuterium content has been run. It will be appreciated that in cases such as this where the samples are chemically the same it is not necessary to use an internal standard with each sample because all the samples will moderate the neutrons to the same extent.

Also, when it is desired only to obtain a measure of the relative abundance of deuterium between two or more chemically alike samples, as is often the case in tracer work, the use of an internal standard is not necessary.

It is to be noted that the sample is not destroyed or chemically altered during the analysis and that following the analysis the sample may be subjected to other analyses, tests, etc. This is a particularly important advantage of the method. Thus, for instance, a gland extract, pharmaceutical or the like containing deuterium as a tracer may be analyzed rapidly and then used for experimentation in animals or otherwise. There are exceptions, however, as for instance where the sample contains certain elements which become harmfully radioactive during the irradiation.

While the principle of the method of the invention has been described and the execution of an analysis and/or calibration has been illustrated, the method, except for certain routine analyses of very similar materials, may be improved in accuracy and the versatility by certain refinements. The first of these concerns the different scattering or reflecting effects of samples of widely different properties on the X-ray beam with which they are irradiated. Thus, for example, if the apparatus is calibrated or standardized with a sample A of known deuterium content and then a sample B of quite different properties is analyzed an error in the absolute concentration of deuterium may result unless an internal standard is used. While the error due to this cause is small when analyzing samples of similar nature and does not materially detract from the method it may become appreciable when samples of widely different nature are involved as, for example, the pair deuterated octane and deuterated water. To overcome this shortcoming, or more properly speaking to allow the error caused by this effect to be known and compensated for, I introduced in a preferred or more refined form of the apparatus a third cell hereinafter referred to as the first monitor cell. This cell indicated by reference number 10 in Figure I is preferably of the same size and shape as cell 2 for convenience in inserting it in the counting instrument.

In a preferred form the cell 10 consists of a closable cylinder of most any material, e.g. aluminum, iron or the like filled (not necessarily completely) with a neutron acceptor material (preferably the same as used in cell 2) to which has been added an easily detectable amount of deuterium in the form of any suitable deuterium compound.

Unlike cells 1 and 2, cell 10 is shielded against penetration by neutrons emitted from the sample in cell 1 and against passage of neutrons from the cell 10 to cell 2. Any single material or combination or mixture of two or more materials having a high absorption cross-section for thermal neutrons and epithermal neutrons may be used. In the case illustrated cell 10 is shielded by lining it (including the cover) with a sheet of indium or, if desired, a sheet of cadmium, or both.

The cell 10 containing the described material and the shielding are positioned, in line with the X-ray source and at least a part of the sample cell 1 or 4 so that it is penetrated primarily by X-rays passing through the sample cell. Its position with respect to the sample cell (and hence also to the X-ray source) allows considerable variation but such position, whatever it may be, should be reproducible from determination to determination since variation in the geometry leads to inaccuracy.

In Figure I a suitable physical arrangement is illustrated. Here an X-ray photon emanating at the gold target 6 passes through the sample and thence through the cell 10 as indicated by the dashed line 12. It will be appreciated that such X-ray photons will produce radio-activity in the material in cell 10 in proportion to their amount and this amount (assuming a constant source from the target 6) will depend upon the absorption effect of the sample in cell 1.

In carrying out an analysis the activity of cell 10 is measured after the irradiation as well as that of cell 1. Variations from the normal activity indicate a change in the absorption effect of the sample and, provided the variation is not too large, allows the measured activity of cell 1 to be corrected to compensate for errors caused by variations in the absorption effects from the standard. The amount of correction to be applied can be calculated since the relative change in absorption with depth of penetration in the sample is known. It is more convenient, however, to determine empirically a correction curve based on a series of known samples.

A further refinement concerns the photon flux applied. It is entirely unnecessary to know what the photon flux is as long as it is known that a significant amount of it is in the energy range herebefore specified. This can readily be determined by inserting a sample known to contain deuterium. If no activity of the neutron acceptor material is recorded it is proved that the X-ray source is insufficient in energy. Generally speaking, the flux of photons having an energy of at least 2.23 mev., can be controlled to within less than 5% variation. Nevertheless it is often desired to obtain a precision in the absolute concentration of deuterium much below this figure. To afford such precision a second refinement is offered in the form of a second monitor cell such as illustrated by the reference number 13 in Figures V and VI. This cell, which is preferably but not necessarily the same size as either cell 2 or cell 10 may be and is preferably similar both in construction and content to cell 10. It is also shielded as is cell 10 by any suitable material to prevent penetration of neutrons. It is pervious to X-rays of energies mentioned above and contains a neutron acceptor material to which has been added a positive and detectable quantity of deuterium. As in cell 10 the shielding may be effected by lining the cell with e.g. indium. The cell 13 is positioned with respect to the sample cell and the X-ray source as to be penetrated by what might be called stray X-rays by which is meant those (such as indicated by the dashed lines 14 and 15) that are not in the main beam and do not penetrate the sample cell. Here again it is important to the usefulness of this monitor cell 13 that its position with respect to the sample cell and the X-ray source be reproducible from determination to determination.

As with cell 10, when using this second monitor cell 13 its activity after irradiation of the sample is measured. If, for example, its net activity after irratiating a sample is 3% above that noted when irradiating the standard sample (or when rerunning the sample with a measured amount of added deuterium) this indicates that the effective photon flux in the required energy range was 3% higher when testing the sample and that the count for the sample should be reduced by this amount to obtain an accurate determination of the deuterium content.

A third refinement which can be used to improve the usefulness of the method concerns the use of a moderator. The neutrons from deuterium by the $H^2(x,n)H^1$ reaction are emitted over a band of energy levels ranging from thermal neutrons to neutrons of very high energies. On the other hand the neutron acceptor materials are only able to capture those in a relatively narrow low energy range. By the application of a suitable moderator a larger portion of neutrons in the energy range suitable for capture by the neutron acceptor material may be obtained and hence the sensitivity of the method may be further increased. The only moderators so far known which are suitable for use with samples of low deuterium content (where the use of a moderator can afford an advantage) are light elements and their compounds, substantially free of deuterium. Examples are water and organic compounds containing substantially no deuterium, e.g. synthesized with relatively pure $H^1$. Other suitable materials are ammonia and hydrogen sulfide, preferably used in the form of normally solid salts. The most convenient moderator is deuterium lean water such as obtained for instance in the overhead in the concentration of heavy water from natural water. Such material may be obtained containing around 5 p.p.m. of deuterium.

The moderator, if used, may be supplied in a separate cell, e.g. a thin annular cell, between the sample cell and the neutron acceptor cell, as between cells 1 and 2 in Figure I but is most conveniently contained in the neutron acceptor cell itself along with the neutron acceptor. Thus, for example, the neutron acceptor cell may be filled with a solution of KI in substantially deuterium free water in which case the iodine in the KI acts as the neutron acceptor and the substantially deuterium free water acts as a moderator increasing the capture of neutrons by the iodine.

As indicated above in the objects of the invention, the method and apparatus of the invention have other applications. Thus, if the natural abundance of deuterium is assumed to be constant within the limits of accuracy sought it is possible by carrying out the analysis as described above on a sample containing hydrogen of the usual atomic weight of 1.008 to obtain an analysis of the hydrogen content of the sample. It is possible in a few minutes and with a sample of around 20 cc. of liquid to determine hydrogen contents as low as 0.03%.

Also, as warned above, the materials of which the cells are constructed and also the sample should be free of beryllium. This is hardly a warning since it will be most unusual where a sample in which it will be desired to determine deuterium will also contain beryllium and as far as the sample cells are concerned no difficulties due to possible beryllium impurity have been encountered in using ordinary commercial aluminum.

The above admonition against appreciable concentration of beryllium in the sample or sample cell is based on the fact that beryllium is capable of a nuclear reaction similar to the above-described reaction of deuterium except that the threshold photon energy is lower, namely 1.67 mev. for beryllium, as compared to 2.23 mev. for deuterium. Thus if beryllium is present in close proximity to the neutron acceptor cell a high value for the deuterium content will be obtained. On the other hand if the concentration of deuterium is low and/or the X-ray photons are limited to energy levels below 2.23 mev. while still containing a sizable flux of photons above 1.67 mev., beryllium may also be determined by an analogous system and method. In this case, of course, the monitor cell or cells, if used, will contain a detectable amount of beryllium in place of deuterium. If beryllium is present in a sample to be analyzed for deuterium it is also possible to effect the analysis without first removing the beryllium by irradiating one time with photons of the energy range required for deuterium and irradiating another time with photons having energies above 1.67 mev. but below 2.23 mev. and subtracting the activity of the latter from the former.

I hereby claim as my invention:

1. Apparatus for the determination of deuterium in samples containing the same, which comprises a combination of an electron source of sufficient energy to generate at a target X-rays having a flux with an energy level above 2.23 mev., a first cell containing the sample to be analyzed reproducibly positioned in the path of X-rays generated at said target, a second cell containing a neutron acceptor material, one of said cells substantially surrounding the other in a plane approximately normal to said X-rays, a third cell shielded by a material having a high absorptive cross-section to prevent substantial passage of neutrons in and out of said cell but pervious to X-rays of the energy level indicated, said third cell being placed in line with the target source of said X-rays and said first cell in a reproducible position and containing in addition to a neutron acceptor material a small amount of deuterium, and means for quantitatively measuring the radioactivity of said second and third cells after a period of irradiation by X-rays of the energy level indicated.

2. Apparatus according to claim 1 which includes a monitor cell reproducibly placed in a position beyond the flux of X-rays passing through the sample cell but within the flux of stray X-rays emanating from the target source, said cell containing a neutron acceptor material along with a detectable amount of deuterium and being shielded against substantial penetration by neutrons but transparent to said X-rays.

References Cited in the file of this patent

UNITED STATES PATENTS 2,161,985  Szilard _____ June 13, 1939

OTHER REFERENCES

Tittle: "Slow-Neutron Detection by Foils," article in Nucleonics, vol. 8, No. 6, June 1951, pages 5 to 9.

Halliday: Introductory Nuclear Physics, published by John Wiley and Sons, Inc., New York, 1955, page 217.